US009355204B2

(12) United States Patent
Seo et al.

(10) Patent No.: US 9,355,204 B2
(45) Date of Patent: May 31, 2016

(54) METHOD OF DECOMPOSING DESIGN LAYOUT FOR DOUBLE PATTERNING PROCESS

(71) Applicant: Samsung Electronics Co., Ltd., Suwon-si (KR)

(72) Inventors: Sang-Wook Seo, Seoul (KR); Jeong-Hoon Lee, Seoul (KR); Hye-Soo Shin, Seoul (KR)

(73) Assignee: Samsung Electronics Co., Ltd. (KR)

( * ) Notice: Subject to any disclaimer, the term of this patent is extended or adjusted under 35 U.S.C. 154(b) by 21 days.

(21) Appl. No.: 14/463,851

(22) Filed: Aug. 20, 2014

(65) Prior Publication Data

US 2015/0227666 A1   Aug. 13, 2015

(30) Foreign Application Priority Data

Feb. 7, 2014   (KR) .................. 10-2014-0014295

(51) Int. Cl.
*G06F 17/50*   (2006.01)
*G03F 1/36*   (2012.01)
*G03F 1/00*   (2012.01)

(52) U.S. Cl.
CPC .............. *G06F 17/5072* (2013.01); *G03F 1/00* (2013.01); *G06F 17/5081* (2013.01); *G03F 1/144* (2013.01); *G03F 1/36* (2013.01); *G06F 17/5068* (2013.01)

(58) Field of Classification Search
CPC ... G06F 17/5068; G06F 17/5081; G03F 1/36; G03F 1/144
USPC ...................................... 716/50–56
See application file for complete search history.

(56) References Cited

U.S. PATENT DOCUMENTS

| 7,876,591 | B2 | 1/2011 | Kwak | |
|---|---|---|---|---|
| 8,391,605 | B2 | 3/2013 | Hsu et al. | |
| 8,473,874 | B1* | 6/2013 | Sharma | G06F 17/5081 700/120 |
| 8,689,149 | B1* | 4/2014 | Du | G03F 1/70 716/51 |
| 8,943,445 | B2* | 1/2015 | Chen | G06F 17/5081 716/132 |
| 2007/0143733 | A1* | 6/2007 | Zach | G03F 1/144 716/52 |
| 2008/0239781 | A1 | 10/2008 | Kwak | |

(Continued)

FOREIGN PATENT DOCUMENTS

KR   100886353   3/2009

OTHER PUBLICATIONS

Tritchkov, Alexander et al., Double-Patterning Decomposition, Design Compliance, and Verification Algorithms AT 32 NM HP, Photomask Technology 2008, Proc. of SPIE vol. 7122, 71220S-1-15.

(Continued)

*Primary Examiner* — Stacy Whitmore
(74) *Attorney, Agent, or Firm* — Onello & Mello, LLP

(57) ABSTRACT

A method of decomposing a design layout for a double patterning process is provided. The method includes changing, by a computing system, a design layout of a first polygon type to a design layout of a curved polygon type; coloring the design layout of the curved polygon type; generating stitching shapes for preventing acute corners in stitching areas of the colored design layout of the curved polygon type; separating the design layout including the stitching shapes for preventing the acute corners into separated design layouts of curved polygon type according to colors; and changing the separated design layouts of the curved polygon type to design layouts of a second polygon type.

18 Claims, 13 Drawing Sheets

(56) References Cited

U.S. PATENT DOCUMENTS

| | | | |
|---|---|---|---|
| 2009/0150849 A1* | 6/2009 | Lee | G06F 17/5068 716/50 |
| 2010/0023915 A1* | 1/2010 | Granik | G03F 1/36 716/50 |
| 2011/0004856 A1* | 1/2011 | Granik | G03F 1/36 716/55 |
| 2011/0004858 A1* | 1/2011 | Chang | G06F 17/5068 716/122 |
| 2011/0197168 A1* | 8/2011 | Chen | G06F 17/5081 716/50 |
| 2012/0005635 A1* | 1/2012 | Lee | G03F 1/36 716/53 |
| 2012/0053892 A1 | 3/2012 | Matsuoka et al. | |
| 2012/0256298 A1 | 10/2012 | Fu et al. | |
| 2014/0101623 A1* | 4/2014 | Chen | G06F 17/5081 716/52 |
| 2014/0223390 A1* | 8/2014 | Sun | G06F 17/5081 716/52 |
| 2014/0258946 A1* | 9/2014 | Kuo | G06F 17/5081 716/55 |
| 2014/0337809 A1* | 11/2014 | Zhao | H01L 29/78 716/55 |
| 2015/0021782 A1* | 1/2015 | Kodama | G06F 17/5077 257/773 |
| 2015/0040088 A1* | 2/2015 | Huang | G06F 17/5081 716/112 |
| 2015/0046887 A1* | 2/2015 | Sun | G06F 17/5081 716/52 |
| 2015/0089457 A1* | 3/2015 | Agarwal | G03F 1/144 716/52 |

OTHER PUBLICATIONS

Luk-Pat, Gerard, Printability Verification for Double-Patterning Technology, Photomask Technology 2008, Proc. of SPIE vol. 7122, 71220Q-1-11.

* cited by examiner

DL1

DL2

DL1

DL2

DL1

DL2

DL1

DL2

METHOD OF DECOMPOSING DESIGN LAYOUT FOR DOUBLE PATTERNING PROCESS

CROSS-REFERENCE TO RELATED APPLICATION

This application claims priority under 35 U.S.C. §119 to Korean Patent Application No. 10-2014-0014295 filed on Feb. 7, 2014 the disclosure of which is hereby incorporated by reference in its entirety.

BACKGROUND

1. Field

Embodiments of the inventive concept provide a method of designing a layout of a mask used for a process of manufacturing a semiconductor device, and particularly, to a method of decomposing a design layout for a double patterning process.

2. Description of Related Art

According to shrinkage of a semiconductor device, it is difficult to form a pattern due to limitations regarding a photolithography process. Double patterning technology (DPT) can be implemented to form a fineness-pattern using the photolithograph process. The DPT changes the photolithography process from a single process to a double process. Various techniques are being studied in order to increase the reliability of the semiconductor device formed using the DPT.

SUMMARY

Embodiments of the inventive concept provide a method of decomposing a design layout for a double patterning process.

Embodiments of the inventive concept further provide a computing system for decomposing a design layout for a double patterning process.

The technical objectives of the inventive disclosure are not limited to the above disclosure; other objectives may become apparent to those of ordinary skill in the art based on the following descriptions.

In accordance with an aspect of the inventive concept, a method of decomposing a design layout for a double patterning process comprises changing, by a computing system, a design layout of a first polygon type to a design layout of a curved polygon type; coloring the design layout of the curved polygon type; generating stitching shapes for preventing acute corners in stitching areas of the colored design layout of the curved polygon type; separating the design layout including the stitching shapes for preventing the acute corners into separated design layouts of curved polygon type according to colors; and changing the separated design layouts of the curved polygon type to design layouts of a second polygon type.

In some embodiments, generating the stitching shapes includes generating a stitching shape having a corner that includes a line when a stitching area of the stitching areas includes an area at which the corner meets the line.

In some embodiments, generating the stitching shapes includes generating a stitching shape, wherein one corner includes another corner when a stitching area of the stitching areas includes an area at which one corner meets another corner.

In some embodiments, generating the stitching shapes includes generating a stitching shape, wherein one line includes another line when a stitching area of the stitching areas includes an area at which the one line meets the other line.

In some embodiments, the separated design layouts of the curved polygon type include one design layout including the stitching shapes for preventing the acute corners, and another design layout including areas having extended portions that the stitching shapes for preventing the acute corners are cut.

In some embodiments, each of the separated design layouts of the curved polygon type includes the stitching shapes for preventing the acute corners.

In some embodiments, the method of decomposing the design layout for the double patterning process further comprises overlapping the separated design layouts of the curved polygon type, and checking whether the acute corners remain in the stitching areas.

In some embodiments, the method of decomposing the design layout for the double patterning process further comprises changing the separated design layouts of the second polygon type to design layouts of the curved polygon type, overlapping the design layouts of curved polygon type, and checking whether the acute corners remain in the stitching areas.

In some embodiments, the method of decomposing the design layout for the double patterning process further comprises checking whether each of the separated design layouts of the curved polygon type satisfies a design rule.

In some embodiments, the method of decomposing the design layout for the double patterning process further comprises checking whether each of the separated design layouts of the second polygon type satisfies a design rule.

In some embodiments, the method of decomposing the design layout for the double patterning process further comprises proceeding with an optical proximity correction (OPC) if the design rule is satisfied.

In accordance with another aspect of the inventive concept, a method of decomposing a design layout for a double patterning process, includes: coloring, by a computing system, a design layout of a polygon type; generating stitching shapes for preventing acute corners in stitching areas of the design layout of the polygon type; and separating the design layout including the stitching shapes for preventing the acute corners according to colors.

In some embodiments, the generating of the stitching shapes for preventing the acute corners in the stitching areas of the design layout of polygon type includes generating a shape having a corner that includes a line when the stitching area includes an area at which a corner meets a line, and generating a shape that one corner includes another corner when the stitching area includes an area at which the one corner meets another corner.

In some embodiments, the method of decomposing the design layout for the double patterning process further comprises changing each of the separated design layouts of the polygon type to design layouts of the curved polygon type, checking whether the acute corners remain by overlapping the separated design layouts of the curved polygon type; and checking whether each of the separated design layouts satisfies a design rule.

In some embodiments, the method of decomposing the design layout for the double patterning process further comprises proceeding with an optical proximity correction (OPC) if the acute corners are not remaining and the design rule is satisfied.

In accordance with still another aspect of the inventive concept, a method of decomposing the design layout for the double patterning process, comprises preparing a design layout of polygonal patterns; changing the design layout of the polygonal patterns to a design layout of curved patterns; and decomposing the changed layout of the curved patterns, including generating stitching shapes for preventing acute corners in stitching areas of the design layout of the curved patterns.

In some embodiments, the method of decomposing the design layout for the double patterning process, further comprises coloring and dividing the design layout of curved patterns into a first design layout and a second design layout with different colors; confirming stitching areas in the colored design layout of curved patterns; generating stitching shapes for preventing acute corners in stitching areas; and separating the colored design layout of the curved polygon type including the stitching shapes according to colors.

In some embodiments, confirming stitching areas includes checking overlapping areas of the colored design layout colored with different color.

In some embodiments, the method of decomposing the design layout for the double patterning process further comprises overlapping the separated design layouts, and checking stitching areas without stitching shapes.

In some embodiments, the method of decomposing the design layout for the double patterning process further comprises checking whether each of the separated design layouts satisfies a design rule; and proceeding with an optical proximity correction (OPC) when each of the separated design layouts satisfies the design rule.

In accordance with still another aspect of the inventive concept, a computing system for decomposing a design layout for a double patterning process, includes: an input unit configured to input commands or various information for an operation of the computing system by a user; a display unit configured to display operating status or result information, etc. for the user; a processor configured to perform a process of decomposing the design layout for the double patterning process according to a process of generating stitching shapes for preventing acute corners; a memory configured to store an information processing algorithm with respect to various commands for the operation of the computing system; a storing unit configured to store various information data for decomposing the design layout and various information data with respect to a result obtained by the operation of the computing system; and a server configured to store various information data and a process needed for decomposing the design layout in the computing system, and various information data with respect to the result obtained by the operation of the computing system.

BRIEF DESCRIPTION OF THE DRAWINGS

The foregoing and other features and advantages of the inventive concept will be apparent from the more particular description of preferred embodiments of the inventive concept, as illustrated in the accompanying drawings in which like reference characters refer to the same parts throughout the different views. The drawings are not necessarily to scale, emphasis instead being placed upon illustrating the principles of the inventive concept. In the drawings.

DETAILED DESCRIPTION OF THE EMBODIMENTS

Figure 1:
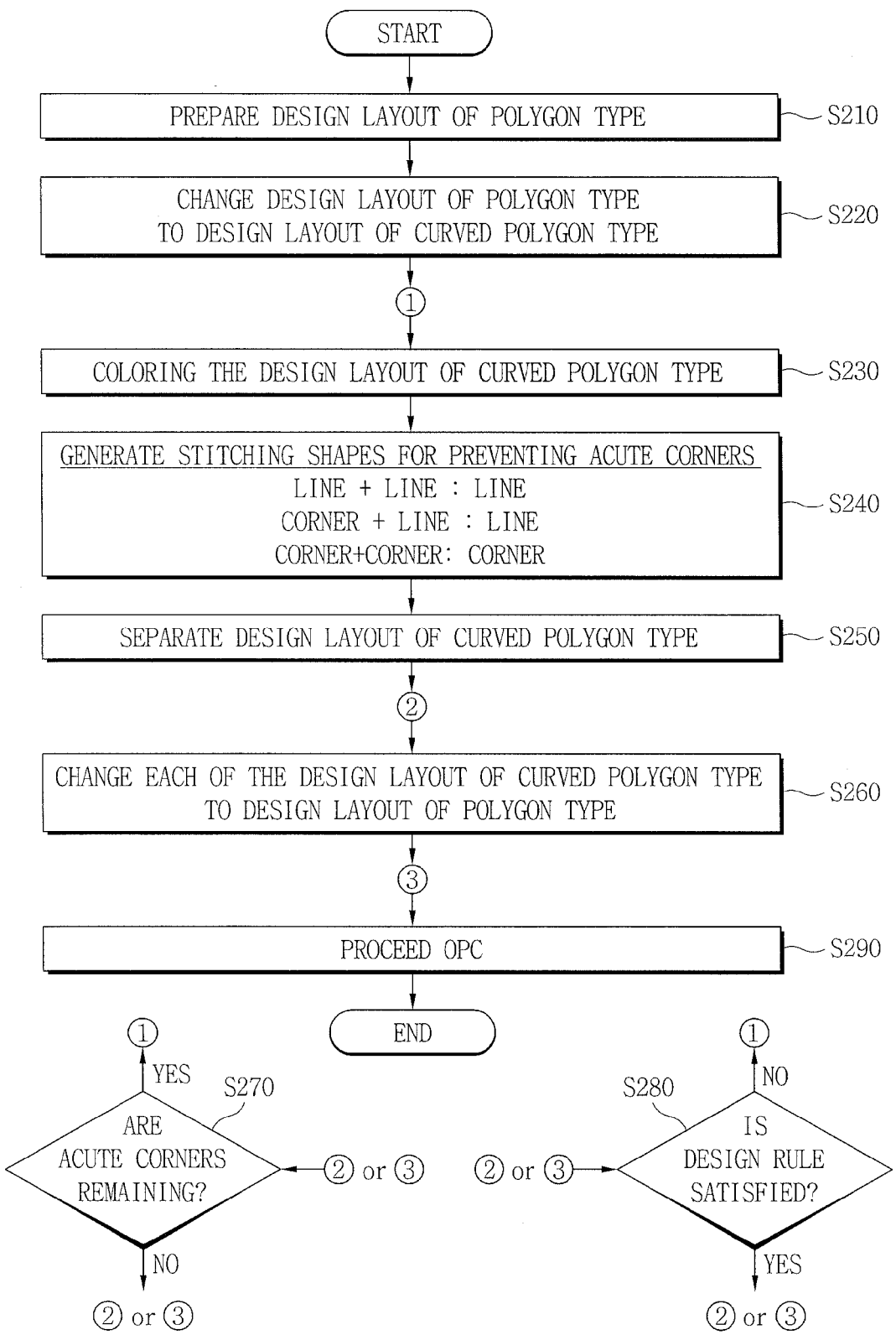
FIG. 1 is a schematic flowchart for describing a method of decomposing a design layout for a double patterning process, according to an embodiment of the inventive concept.

Various embodiments will now be described more fully with reference to the accompanying drawings in which some embodiments are shown. This inventive concept may, however, be embodied in different form's and should not be construed as limited to the embodiments set forth herein. Rather, these embodiments are provided so that this disclosure is thorough and complete and fully conveys the scope of the inventive concept to those skilled in the art.

The terminology used herein is for the purpose of describing particular embodiments only and is not intended to be limiting of the inventive concept. As used herein, the singular forms "a," "an," and "the" are intended to include the plural forms as well, unless the context clearly indicates otherwise. It will be further understood that the terms "comprises" and/or "comprising," when used herein, specify the presence of stated features, integers, steps, operations, elements, and/or components, but do not preclude the presence or addition of one or more other features, integers, steps, operations, elements, components, and/or groups thereof As used herein, the term "and/or" includes any and all combinations of one or more of the associated listed items.

Embodiments of the inventive concept are described herein with reference to cross-section and/or plan illustrations that are schematic illustrations of idealized embodiments of the inventive concept. In the drawings, the thicknesses of layers and regions are exaggerated for clarity. As such, variations from the patterns of the illustrations as a result, for example, of manufacturing techniques and/or tolerances, are to be expected. Thus, embodiments of the inventive concept should not be construed as limited to the particular patterns of regions illustrated herein but are to include deviations in patterns that result, for example, from manufacturing. For example, an etched region illustrated as a rectangle will, typically, have rounded or curved features. Thus, the regions illustrated in the figures are schematic in nature and their patterns are not intended to illustrate the precise pattern of a region of a device and are not intended to limit the scope of the inventive concept.

Like numbers refer to like elements throughout. Thus, the same or similar numbers may be described with reference to other drawings even if they are neither mentioned nor described in the corresponding drawing. Also, even elements that are not denoted by reference numbers may be described with reference to other drawings.

FIG. 1 is a schematic flowchart for describing a method of decomposing a design layout for a double patterning process according to an embodiment of the inventive concept.

Referring to FIG. 1, a method of decomposing a design layout for a double patterning process includes preparing a design layout of a first polygon type (S210), changing the design layout of the first polygon type to a design layout of a curved polygon type (S220), coloring the design layout of the curved polygon type (S230), generating stitching shapes for preventing acute corners in the design layout of the curved polygon type (S240), separating the design layout of the curved polygon type (S250), changing the design layouts of the curved polygon type to design layouts of a second polygon type (S260), checking whether the acute corners remain (S270), checking whether a design rule is satisfied (S280), and proceeding with performing an optical proximity correction (OPC) (S290). The first and second polygon types can be similar or different from each other.

The design layout is to design a mask pattern used for implementing a circuit designed by a semiconductor circuit design technician or engineer on a wafer. Particularly, the design layout is manually formed by a full customer layout method that the design technician or engineer designs elements such as a transistor, a resistor, a capacitor, etc. used in a design circuit and connects wiring, or is automatically formed by a computing system using schematic driven layout tools or auto place and routing (Auto P&R) tools, etc. of automatically arranging a logic element cell provided in a process on a desired location and connecting wiring based on designed circuit information.

Figure 2:
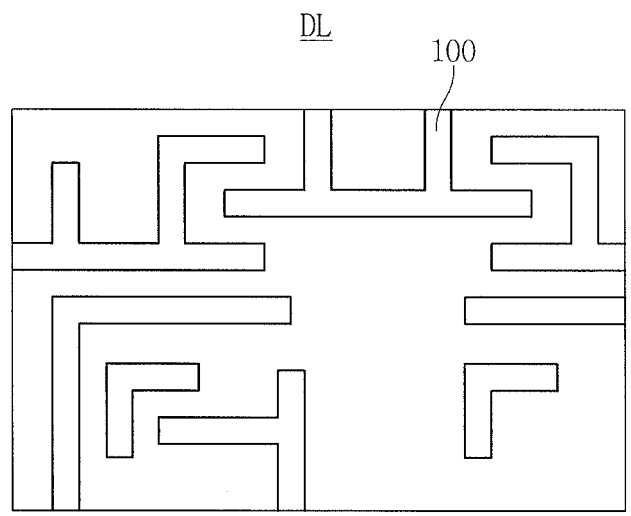
FIG. 2 is a design layout of a polygon type illustrating an example of a part of a design layout for manufacturing a semiconductor device.

FIG. 2 is a design layout of polygon type illustrating an example of a part of a design layout for manufacturing a semiconductor device. A design layout DL formed by a full customer layout method, schematic driven layout tools, or Auto P&R tools has one or more polygonal patterns.

According to a shrinkage of a semiconductor device, a double patterning technology (DPT) is used which forms a fineness-pattern by changing a photolithography process from a single process to a double process. The DPT is applied when it is difficult to form a pattern using the design layout DL shown in FIG. 2 due to a limitation of the photolithography process. For the DPT, the design layout DL shown in FIG. 2 has to be decomposed into two design layouts according to the number of repeated photolithography processes. The decomposition of the design layout DL is performed by the computing system, and is performed by inputting a command to the computing system after the design technician or engineer checks a design rule, or is automatically performed after checking the design rule from an input or stored design layout DL.

The decomposition of the design layout by the computing system includes confirming the design layout DL, for example, shown and described with reference to FIG. 2 (S210), and changing the design layout of a polygon type to the design layout of curved polygon type, for example, as shown and described with reference to FIG. 3 (S220). The changing of the design layout of polygon type to the design layout of curved polygon type (S220) may be performed by simulating an exposure process of the photolithography process. As an example, when performing the exposure process in an exposure apparatus using the design layout of polygon type shown in FIG. 2, the design layout of the curved polygon type shown in FIG. 3 may be formed as a result of simulating patterns transferred on the wafer.

Figure 3:
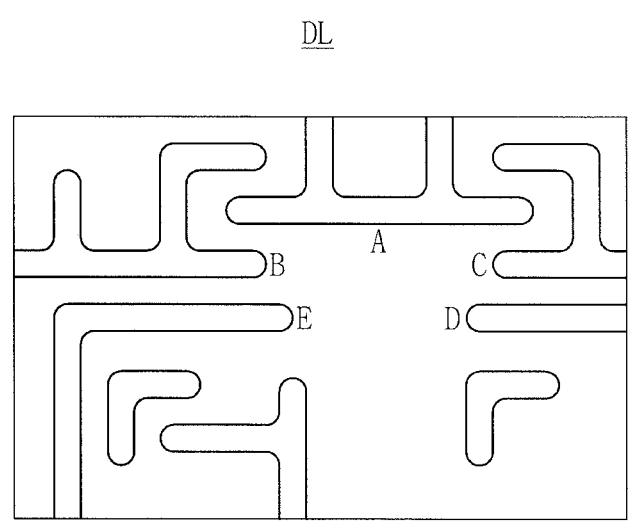
FIG. 3 is a design layout illustrating an example that the polygon type shown in FIG. 2 are changed to a curved polygon type, according to an embodiment of the inventive concept.

The computing system may decompose a design layout for the DPT using the design layout of a curved polygon type shown in FIG. 3. This may be achieved at least in part by performing a coloring process (S230), and dividing the layout into design layouts 11 and 12 with different colors for forming each mask, as shown in FIG. 5.

Figure 4:
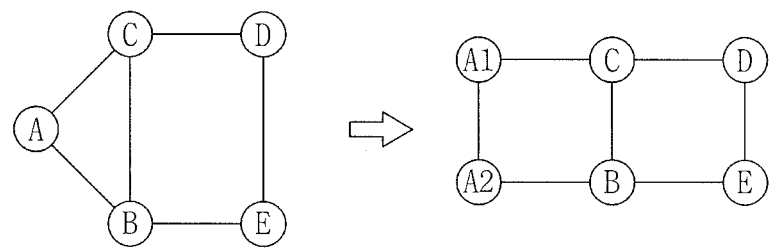
FIG. 4 is a conflict graph illustrating an example of a conflict relationship between curved polygons with respect to the design layout of curved polygon type shown in FIG. 3, according to an embodiment of the inventive concept.

For example, after confirming the design layout DL shown in FIG. 3, the computing system constructs a conflict relationship of curved polygons A, B, C, D, and E as a conflict graph, illustrated at FIG. 4. The design layout DL can be separated into different mask layouts, for example, due to a distance between the curved polygons being smaller than a predetermined minimum distance in the double patterning process. In doing so, the coloring process can proceed after stitching the curved polygon A into curved polygons A1 and A2 in order to change an odd cycle to an even cycle. The steps are performed in this order since the coloring process can proceed as two colors when opposing sides in the conflict graph are the even cycle B, C, D, and E, but cannot proceed as two colors when the opposing sides in the conflict graph are the odd cycle A, B, and C.

Figure 5:
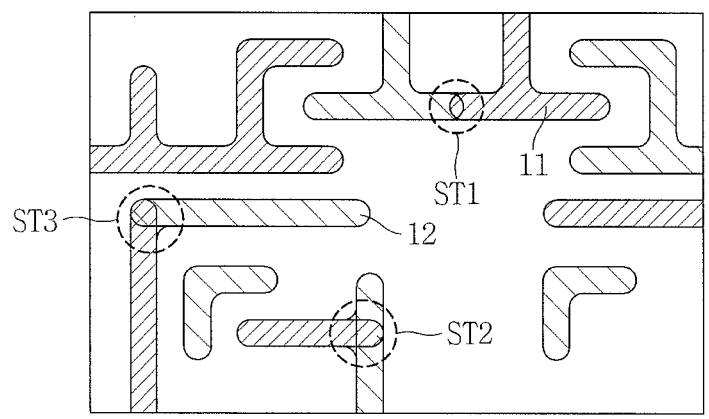
FIG. 5 is a design layout illustrating an example that the design layout of the curved polygon type shown in FIG. 3 is colored, according to an embodiment of the inventive concept.
Figure 6:
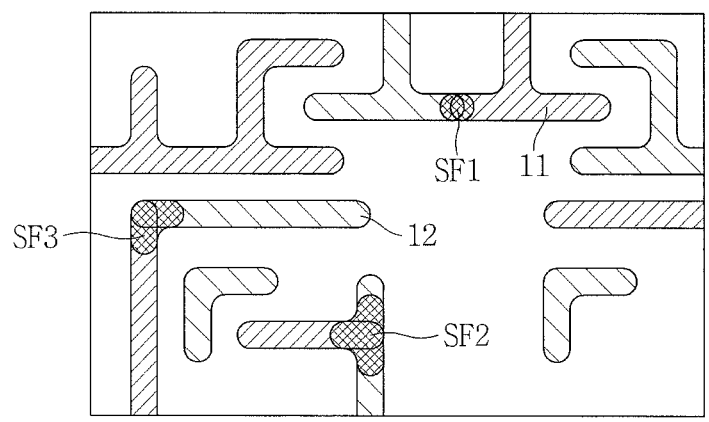
FIG. 6 is a design layout illustrating an example that stitching shapes for preventing acute corners with respect to the design layout of curved polygon type shown in FIG. 5, are formed according to an embodiment of the inventive concept.

The computing system confirms stitching areas ST1, ST2, and ST3 in the design layout of a curved polygon type shown in FIG. 5, and generates stitching shapes SF1, SF2, and SF3 for preventing acute corners in the stitching areas ST1, ST2, and ST3 as shown in FIG. 6, which corresponds to step (S240) of FIG. 1. In some embodiments, the stitching shape SF1 may be generated such that one line includes another line when the stitching area ST1 is an area in which one line meets another line. In other embodiments, the stitching shape SF2 may be generated such that a corner includes a line when the stitching area ST2 is an area at which a corner meets a line. The stitching shape SF3 may be generated such that one corner includes another corner when the stitching area ST3 is an area at which one corner meets another corner.

Figure 7:
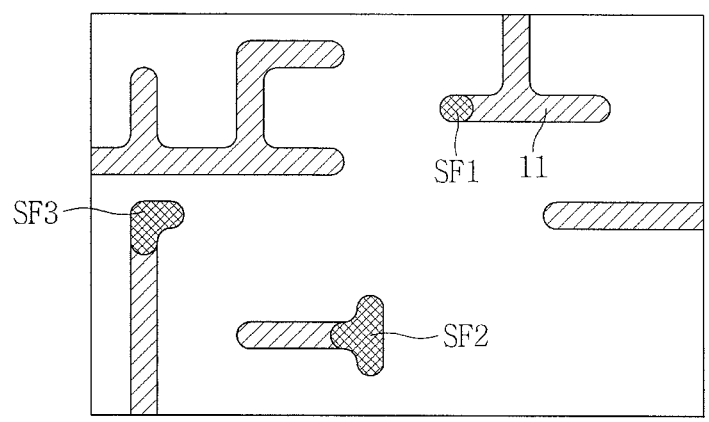
FIG. 7 or 8 is design layouts illustrating an example that the design layout of the curved polygon type shown in FIG. 6 is separated according to colors, according to an embodiment of the inventive concept.
Figure 7:
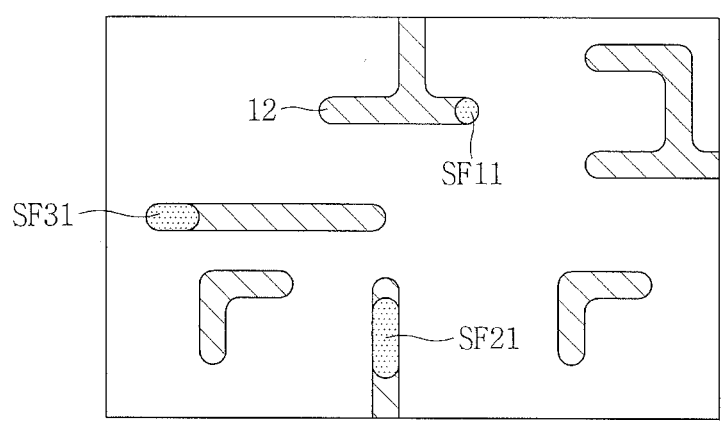
Figure 8:
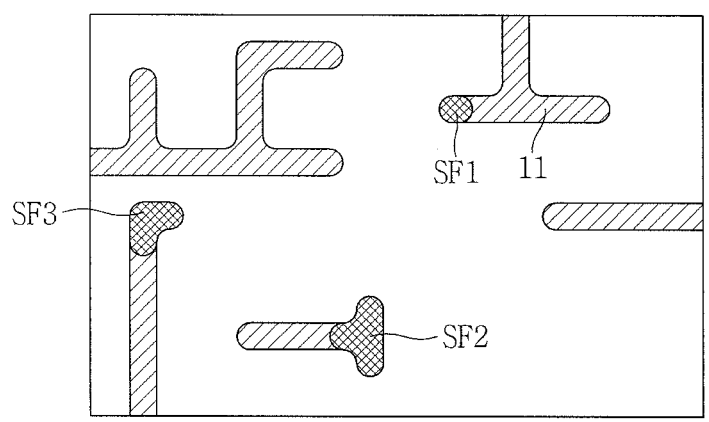
Figure 8:
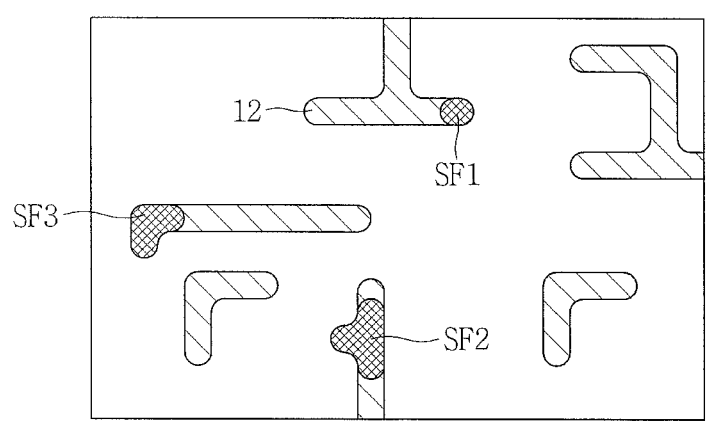

Design layouts DL1 and DL2 of curved polygon types, respectively, corresponding to each mask for the double patterning process as shown in FIG. 7 or 8 are formed by separating the design layout of a curved polygon type DL according to colors so as to include the stitching shapes SF1, SF2, and SF3 for preventing the acute corners generated as shown in FIG. 6, which corresponds to step (S250) of FIG. 1.

As illustrated in FIG. 7, one colored design layout DL1 of a curved polygon type includes stitching shapes SF1, SF2, and SF3 for preventing the acute corners. Another colored design layout DL2 of a curved polygon type includes areas SF11, SF21, and SF31 extending portions that the stitching shapes SF1, SF2, and SF3 are cut for preventing the acute corners. As illustrated in FIG. 8, each of the colored design layouts DL1 and DL2 of a curved polygon type includes stitching shapes SF1, SF2, and SF3 for preventing the acute corners.

Figure 9:
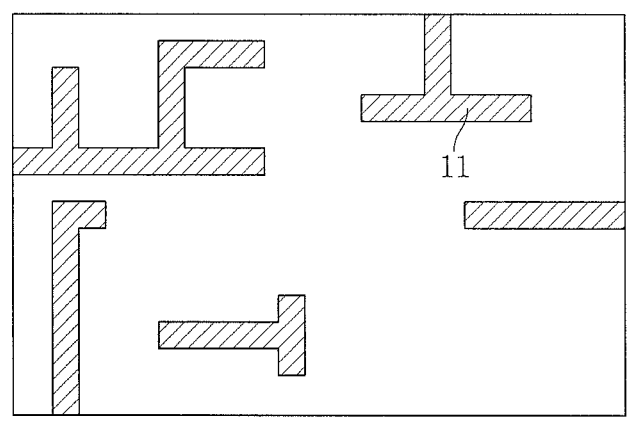
FIGS. 9 and 10 are design layouts illustrating an example that the design layouts of curved polygon type shown in FIGS. 7 and 8, respectively, are changed to design layouts of a polygon type, according to an embodiment of the inventive concept.
Figure 9:
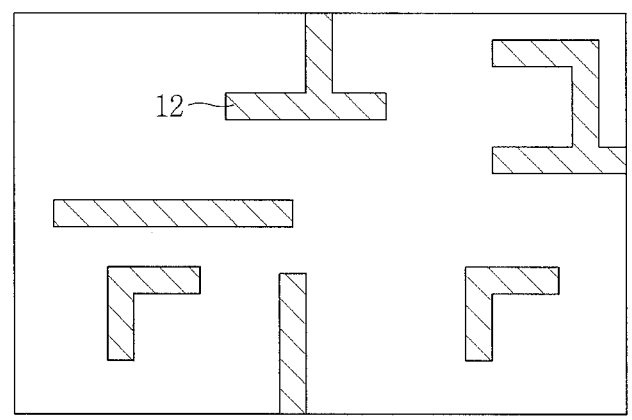
Figure 10:
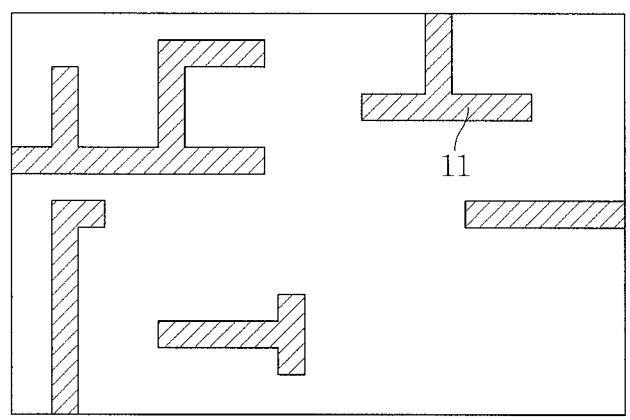
Figure 10:
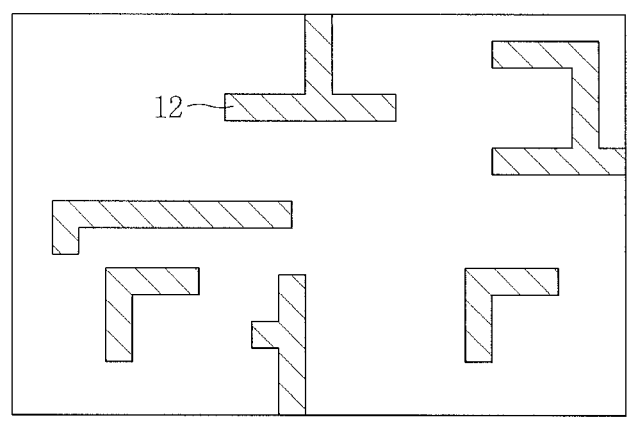

As the separated design layouts DL1 and DL2 as shown FIG. 7 or 8 are changed to design layouts of a polygon type shown in FIG. 9 or 10, respectively (see FIG. 1 at step (S260)), the design layout for manufacturing each mask for the double patterning process is completed.

Figure 11:
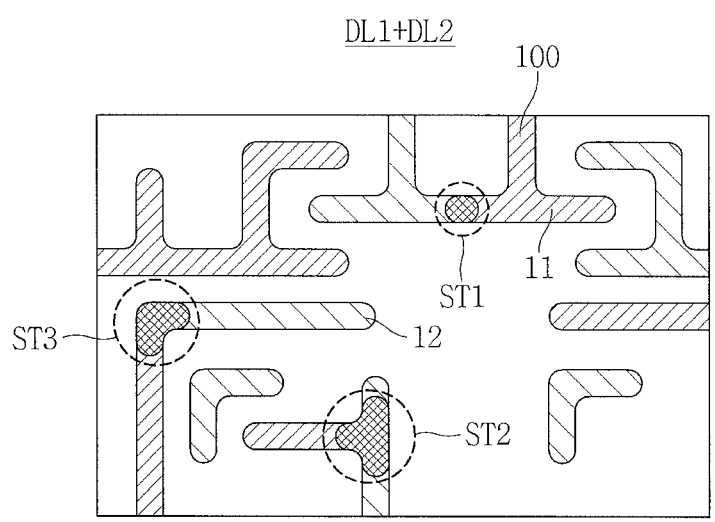
FIG. 11 is a design layout illustrating an example that the design layouts of the curved polygon type shown in FIGS. 7 and 8 are overlapped, according to an embodiment of the inventive concept.

When proceeding a process using the design layouts DL1 and DL2 formed respectively for the double patterning process, the computing system check whether the acute corners remain (see FIG. 1 at step (S270)) overlaps each of the design layouts DL1 and DL2 of curved polygon type shown in FIG. 7 or 8 as shown in FIG. 11. The computing system also checks whether the acute corners are remained in the stitching areas ST1, ST2, and ST3, or changes each of the design layouts DL1 and DL2 of polygon type shown in FIG. 9 or 10 to the design layouts DL1 and DL2 of curved polygon type shown in FIG. 7 or 8, overlaps the design layouts DL1 and DL2 of curved polygon type as shown in FIG. 11, and checks whether the acute corners are remained in the stitching areas ST1, ST2, and ST3. When the acute corners remain, the computing system determines a stitching error, and again proceeds from the coloring process with respect to the design layout of the curved polygon type shown in FIG. 3.

Further, the computing system checks whether each of the design layouts DL1 and DL2 of a curved polygon type shown in FIG. 7 or 8 satisfies a design rule (see FIG. 1 at step (S280)), or checks whether each of the design layouts of polygon type DL1 and DL2 shown in FIG. 9 or 10 satisfies the design rule (S280). When it is determined that each of the design layouts does not satisfy the design rule, and again proceeds from the coloring process with respect to the design layout of curved polygon type shown in FIG. 3.

When each of the design layouts DL1 and DL2 does not form the acute corners and satisfies the design rule, the computing system proceeds with performing an optical proximity correction (OPC) or the like (see FIG. 1 at step (S290)).

The method of decomposing a design layout for a double patterning process according to an embodiment of the inventive concept changes a design layout of polygon type to a design layout of curved polygon type, decomposes the changed design layout of curved polygon type, checks the stitching corner areas in which the acute corners may be formed in the design layouts of curved polygon type, generates the stitching shapes for preventing the acute corners, and prevents the generation of the acute corners.

Figure 12:
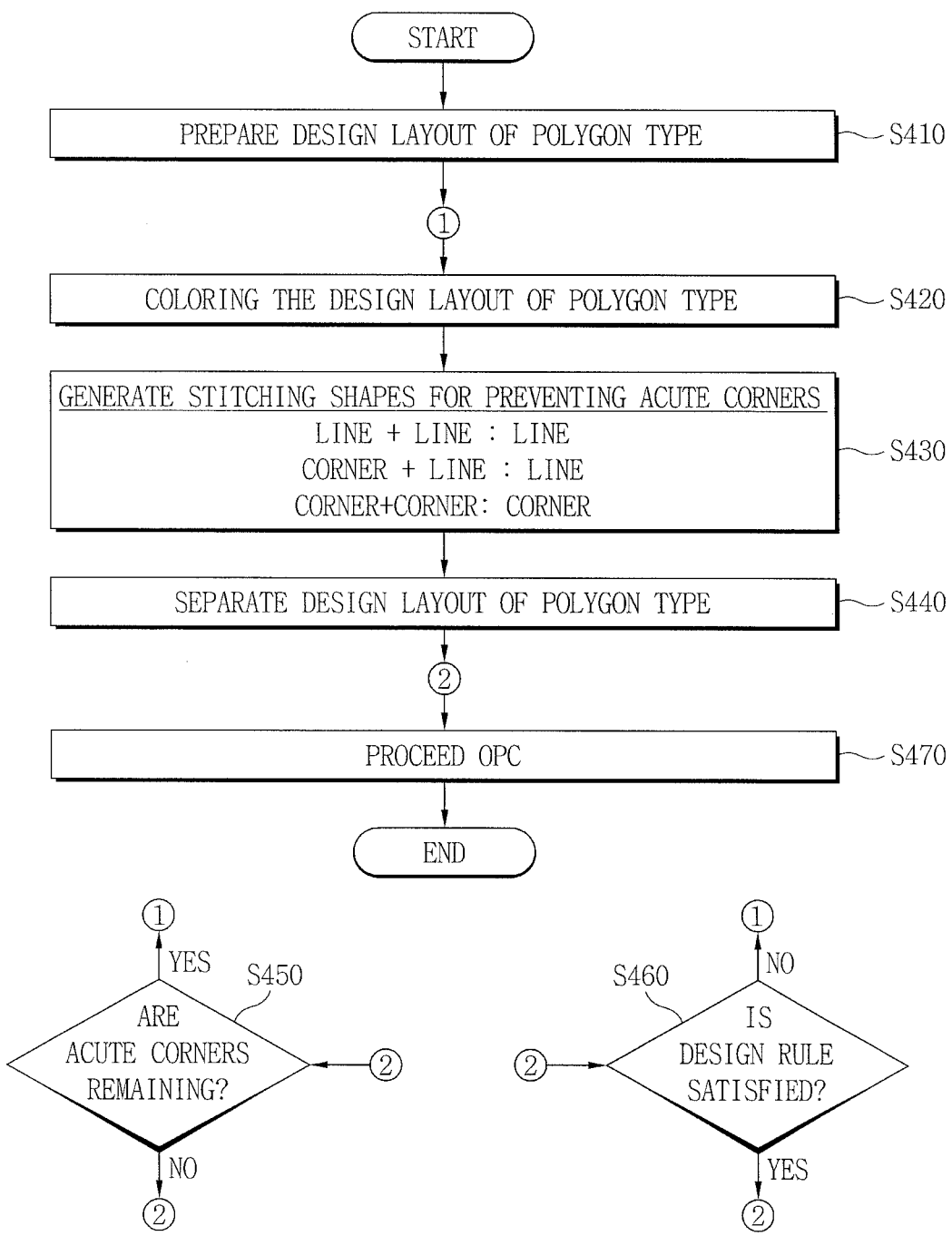
FIG. 12 is a schematic flowchart for describing a method of decomposing a design layout for a double patterning process, according to an embodiment of the inventive concept.

FIG. 12 is a schematic flowchart for describing a method of decomposing a design layout for a double patterning process according to an embodiment of the inventive concept.

Referring to FIG. 12, a method is described for decomposing a design layout for a double patterning process according to another embodiment of the inventive concept. The method includes preparing a design layout of a polygon type (S410), coloring the design layout of the polygon type (S420), generating stitching shapes for preventing acute corners in the design layout of polygon type (S430), separating the design layout of polygon type (S440), checking whether the acute corners are remained (S450), checking whether a design rule is satisfied (S460), and proceeding with performing an OPC or the like (S470).

The computing system decomposes of the design layout for the double patterning process by preparing a design layout DL of polygon type shown in FIG. 2 (S410). A mask pattern is used for implementing a circuit designed by a semiconductor circuit design technician or engineer on a wafer, and is designed for proceeding with a coloring process with respect to the design layout of the polygon type (S420). The design layout of polygon type is divided into design layouts 21 and 22 with different colors for forming each mask as shown in FIG. 13.

Figure 13:
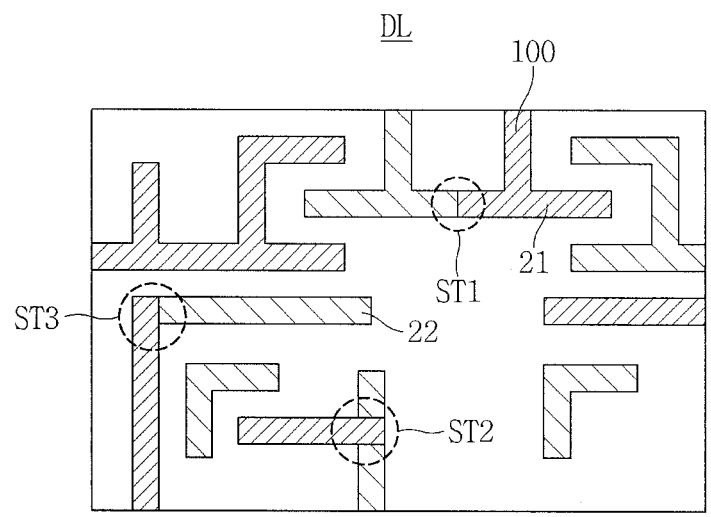
FIG. 13 is a design layout illustrating an example that the design layout of polygon type shown in FIG. 2 is colored, according to an embodiment of the inventive concept.
Figure 14:
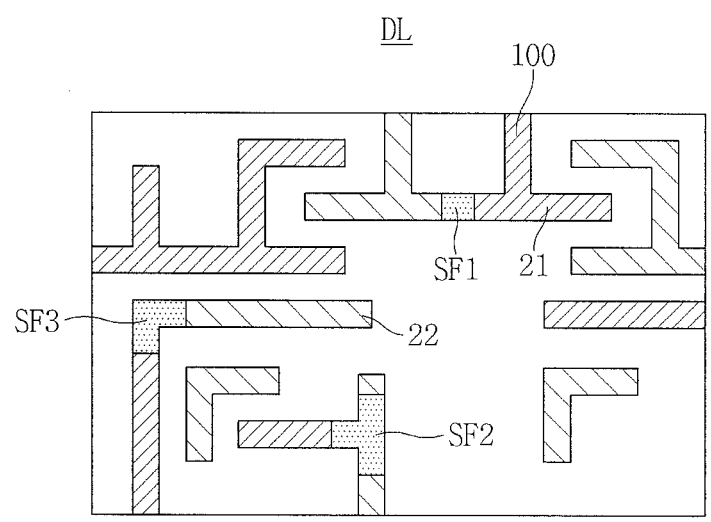
FIG. 14 is a design layout illustrating an example that stitching shapes for preventing acute corners with respect to the design layout shown in FIG. 13 are formed, according to an embodiment of the inventive concept.

The computing system confirms the stitching areas ST1, ST2, and ST3 in the design layout of polygon type shown in FIG. 13, and generates the stitching shapes SF1, SF2, and SF3 for preventing the acute corners in the stitching areas ST1, ST2, and ST3 shown in FIG. 14 (see FIG. 12 at step (S430)). As shown in FIGS. 13 and 14, the stitching shape SF1 may be generated such that one line includes another line when the stitching area ST1 is an area in which one line meets the other line. The stitching shape SF2 may be generated such that a corner includes a line when the stitching area ST2 is an area in which a corner meets a line. The stitching shape SF3 may be generated such that one corner includes another corner when the stitching area ST3 is an area in which one corner meets the other corner.

Figure 15:
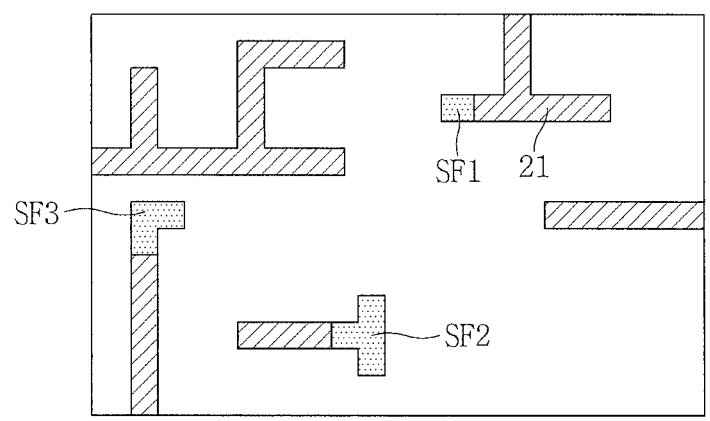
FIG. 15 or 16 is design layouts illustrating an example that the design layout shown in FIG. 14 is separated according to colors, according to an embodiment of the inventive concept.
Figure 15:
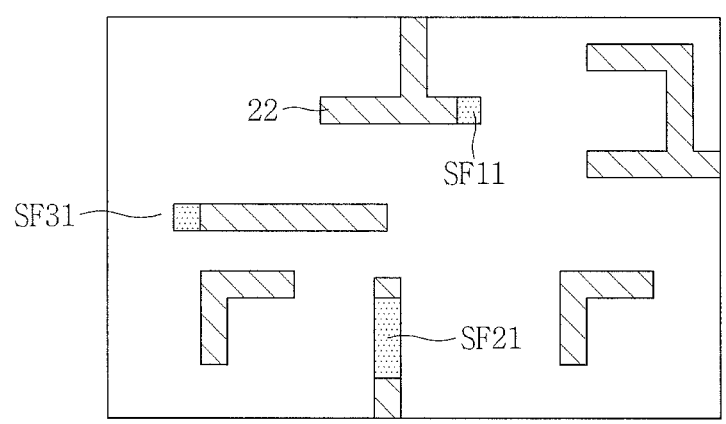
Figure 16:
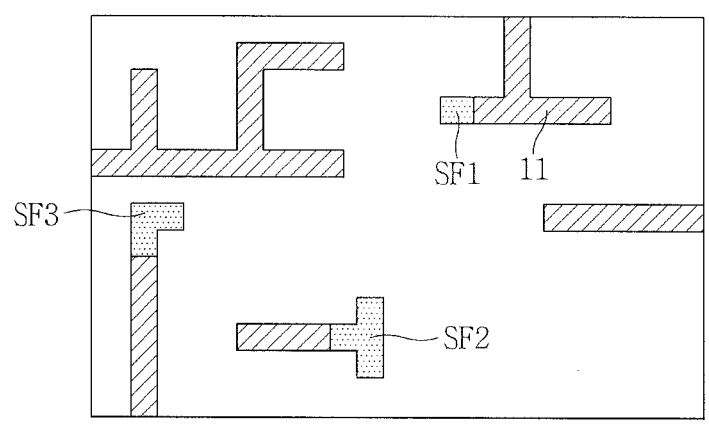
Figure 16:
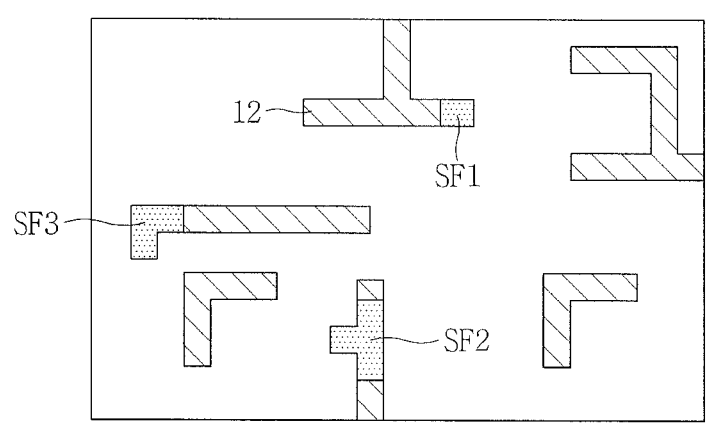

The design layout for manufacturing each mask for the double patterning process is completed by separating the design layout of a polygon type so as to include the stitching shapes for preventing the acute corners formed as shown in FIG. 14 according to colors (see FIG. 12 at step (S440)), and forming the design layouts DL1 and DL2 corresponding to each mask for the double patterning process as shown in FIG. 15 or 16.

As illustrated in FIG. 15, one design layout DL1 of a polygon type includes the stitching shapes SF1, SF2, and SF3 for preventing the acute corners. Another design layout DL2 of a polygon type includes areas SF11, SF21, and SF31 at portions of the stitching shapes for preventing the acute corners are cut. As illustrated in FIG. 16, each of the design layouts DL1 and DL2 of a polygon type includes the stitching shapes SF1, SF2, and SF3 for preventing acute corners.

When proceeding processes using the design layouts DL1 and DL2 are formed respectively for the double patterning process, the computing system checks whether the acute corners remained (see FIG. 12 at step (S450)), changes each of the design layouts DL1 and DL2 of polygon type shown in FIG. 15 or 16 to the design layouts of curved polygon type DL1 and DL2 shown in FIG. 7 or 8, overlaps each of the design layouts DL1 and DL2 of curved polygon type shown in FIG. 7 or 8 as shown in FIG. 11, and checks whether the acute corners are remained in the stitching areas ST1, ST2, and ST3. The computing system determines remaining acute corners as a stitching error, and again proceeds from the coloring process with respect to the design layout of polygon type as shown in FIG. 13.

Further, the computing system checks whether each of the separated design layouts DL1 and DL2 of polygon type shown in FIG. 15 or 16 satisfies a design rule (see FIG. 12 at step (S460)). If not, the computing system again proceeds from the coloring process with respect to the design layout shown as shown in FIG. 13.

When each of the separated design layouts DL1 and DL2 is determined to not form the acute corners and satisfies the design rule, the computing system proceeds the OPC (see FIG. 12 at step (S470)).

Figure 17:
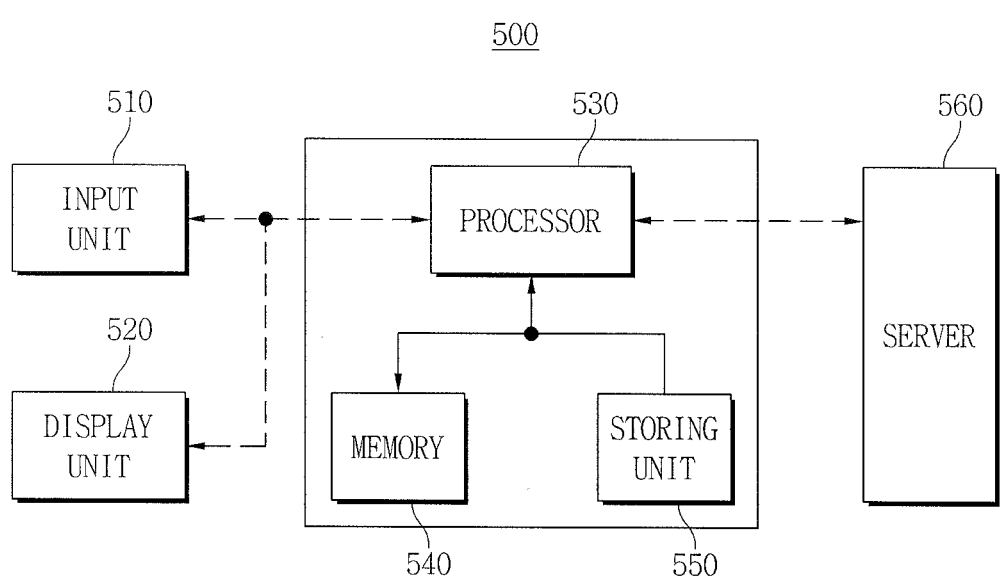
FIG. 17 is a schematic block diagram of a computing system for decomposing a design layout for a double patterning process, according to an embodiment of the inventive concept.

FIG. 17 is a schematic block diagram of a computing system 500 for decomposing a design layout for a double patterning process according to an embodiment of the inventive concept. Some or all of one or more of the double patterning processes in accordance with embodiments described herein can be executed by the computing system 500

Referring to FIG. 17, a computing system 500 includes an input unit 510, a display unit 520, a processor 530, a memory 540, a storing unit 550, and a server 560.

The input unit 510 may include a keyboard, a mouse, a touchpad, a stylus, or peripheral device known to those of ordinary skill in the art, and is used for inputting a command or various information for an operation of the computing system 500 by a user.

The display unit 520 displays operating status or result information, etc. for the user.

The processor 530 performs a process of decomposing the design layout for the double patterning process, for example, an embodiment of the inventive concept of FIG. 1 or 12 according to a signal of the input unit 510.

The memory 540 includes a read only memory (ROM), a random access memory (RAM), etc., and according to an embodiment of the inventive concept, stores information with respect to an algorithm of decomposing the design layout in the processor 530 and information processing algorithm with respect to various commands for the operation of the computing system 500.

The storing unit 550 stores various information data for decomposing the design layout and various information data with respect to the result obtained by the operation of the computing system 500, according to an embodiment of the inventive concept.

The server 560 stores various information data and the algorithm needed for decomposing the design layout in the computing system 500, and various information data with respect to the result obtained by the computing system 500 performing an operation.

A method of decomposing the design layout for the double patterning process according to embodiments of the inventive concept changes a design layout of polygon type to a design layout of curved polygon type, decomposes the design layout of curved polygon type, checks stitching corner areas at which acute corners may be formed, generates stitching shapes for preventing the acute corners, and thus prevents the generation of the acute corners.

The foregoing is illustrative of embodiments and is not to be construed as limiting thereof. Although a few embodiments have been described, those skilled in the art will readily appreciate that many modifications are possible without materially departing from the novel teachings and advantages. Accordingly, all such modifications are intended to be included within the scope of this inventive concept as defined in the claims. In the claims, means-plus-function clauses are intended to cover the structures described herein as performing the recited function, and not only structural equivalents but also equivalent structures.

What is claimed is:

1. A method of decomposing a design layout for a double patterning process, comprising:
   changing, by a computing system, a design layout of a first polygon type to a design layout of a curved polygon type;
   coloring the design layout of the curved polygon type;
   generating stitching shapes for preventing acute corners in stitching areas of the colored design layout of the curved polygon type;
   separating the design layout including the stitching shapes for preventing the acute corners into separated design layouts of curved polygon type according to colors; and
   changing the separated design layouts of the curved polygon type to design layouts of a second polygon type.

2. The method of decomposing the design layout for the double patterning process of claim 1, wherein generating the stitching shapes includes generating a stitching shape having a corner that includes a line, when a stitching area of the stitching areas includes an area at which the corner meets the line.

3. The method of decomposing the design layout for the double patterning process of claim 1, wherein generating the stitching shapes includes generating a stitching shape, wherein one corner includes another corner when a stitching area of the stitching areas includes an area at which one corner meets another corner.

4. The method of decomposing the design layout for the double patterning process of claim 1, wherein generating the stitching shapes includes generating a stitching shape, wherein one line includes another line when a stitching area of the stitching areas includes an area at which the one line meets the other line.

5. The method of decomposing the design layout for the double patterning process of claim 1, wherein the separated design layouts of the curved polygon type include one design layout including the stitching shapes for preventing the acute corners, and another design layout including areas having extended portions that the stitching shapes for preventing the acute corners are cut.

6. The method of decomposing the design layout for the double patterning process of claim 1, wherein each of the separated design layouts of the curved polygon type includes the stitching shapes for preventing the acute corners.

7. The method of decomposing the design layout for the double patterning process of claim 1, further comprising overlapping the separated design layouts of the curved polygon type, and checking whether the acute corners remain in the stitching areas.

8. The method of decomposing the design layout for the double patterning process of claim 1, further comprising changing the separated design layouts of the second polygon type to design layouts of the curved polygon type, overlapping the design layouts of curved polygon type, and checking whether the acute corners remain in the stitching areas.

9. The method of decomposing the design layout for the double patterning process of claim 1, further comprising checking whether each of the separated design layouts of the curved polygon type satisfies a design rule.

10. The method of decomposing the design layout for the double patterning process of claim 1, further comprising checking whether each of the separated design layouts of the second polygon type satisfies a design rule.

11. The method of decomposing the design layout for the double patterning process of claim 10, further comprising proceeding with an optical proximity correction (OPC) if the design rule is satisfied.

12. A method of decomposing a design layout for a double patterning process, comprising:
   coloring, by a computing system, a design layout of a polygon type;
   generating stitching shapes for preventing acute corners in stitching areas of the design layout of the polygon type; and
   separating the design layout including the stitching shapes for preventing the acute corners according to colors, wherein the generating of the stitching shapes for preventing the acute corners in the stitching areas of the design layout of polygon type includes generating a shape having a corner that includes a line when the stitching area includes an area at which a corner meets a line, and generating a shape that one corner includes another corner when the stitching area includes an area at which the one corner meets another corner.

13. The method of decomposing the design layout for the double patterning process of claim 12, further comprising:
   changing each of the separated design layouts of the polygon type to design layouts of the curved polygon type;
   checking whether the acute corners remain by overlapping the separated design layouts of the curved polygon type; and
   checking whether each of the separated design layouts satisfies a design rule.

14. The method of decomposing the design layout for the double patterning process of claim 13, further comprising proceeding with an optical proximity correction (OPC) if the acute corners are not remaining and the design rule is satisfied.

15. A method of decomposing a design layout for a double patterning process, comprising:
   preparing a design layout of polygonal patterns;
   changing the design layout of the polygonal patterns to a design layout of curved patterns; and
   decomposing the changed layout of the curved patterns, including generating stitching shapes for preventing acute corners in stitching areas of the design layout of the curved patterns, and further comprising:
   coloring and dividing the design layout of curved patterns into a first design layout and a second design layout with different colors;
   confirming stitching areas in the first and second design layouts of curved patterns;
   generating stitching shapes for preventing acute corners in stitching areas; and
   separating the first and second design layouts of the curved patterns including the stitching shapes according to colors.

16. The method of decomposing the design layout for the double patterning process of claim 15, wherein confirming stitching areas includes checking overlapping areas of the first and second design layouts colored with different color.

17. The method of decomposing the design layout for the double patterning process of claim 15, further comprising:
   overlapping the separated first and second design layouts, and
   checking stitching areas without stitching shapes.

18. The method of decomposing the design layout for the double patterning process of claim 15, further comprising:
   checking whether each of the separated first and second design layouts satisfies a design rule; and
   proceeding with an optical proximity correction (OPC) when each of the separated design layouts satisfies the design rule.

\* \* \* \* \*